UNITED STATES PATENT OFFICE.

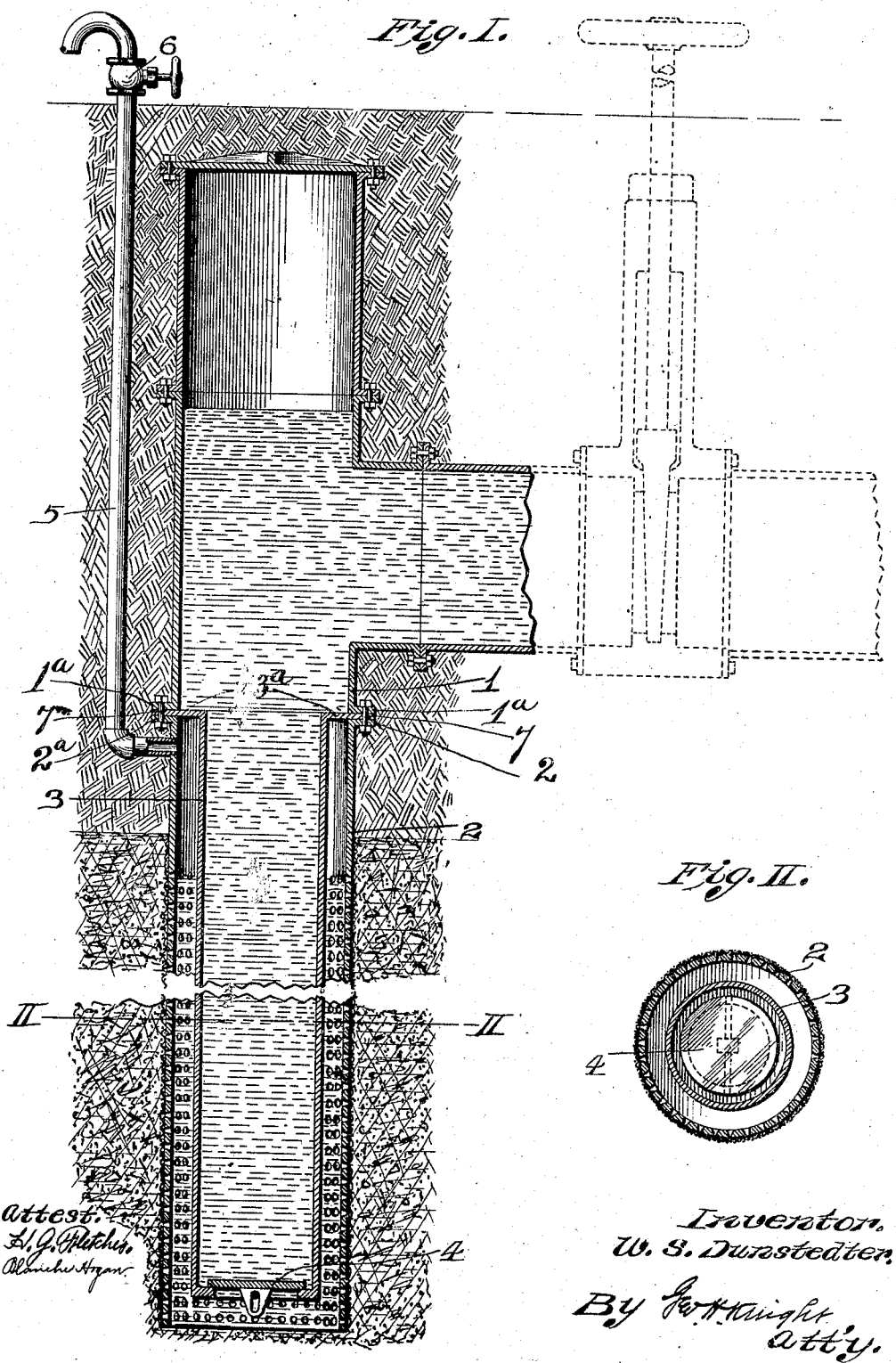
W. S. DUNSTEDTER.
STRAINER FOR PUMPS.
APPLICATION FILED FEB. 28, 1908.
911,959.
Patented Feb. 9, 1909.
Fig. I.
Fig. II.
Inventor.
W. S. Dunstedter.
By Geo. H. Knight
att'y.
Attest:

WILLIAM S. DUNSTEDTER, OF POAG, ILLINOIS.

STRAINER FOR PUMPS.

No. 911,959.   Specification of Letters Patent.   Patented Feb. 9, 1909.

Application filed February 28, 1908. Serial No. 418,269.

*To all whom it may concern:*

Be it known that I, WILLIAM S. DUNSTEDTER, a citizen of the United States of America, residing at Poag, in the county of Madison and State of Illinois, have invented certain new and useful Improvements in Strainers for Pumps, of which the following is a full, clear, and exact description, reference being had to the accompanying drawings, forming part of this specification.

My invention relates to an improvement in strainers for pumps used in deep wells.

In the operation of pumps in deep wells it frequently occurs that the water line will become lowered during the operation of a pump to such an extent that air will be drawn through the strainer tube of the well tube and into the pump with the result of interfering with the capacity and proper action of the pump.

The object of my invention is the provision of means to prevent the sucking of air through the strainer tubes of pumps of the kind named when the water line in the well tube in which a pump is being used becomes lower than the top of the strainer tube.

Figure I is a vertical section of the deep well tube having my improvement incorporated therein. Fig. II is a cross section taken on line II—II, Fig. I.

1 designates a deep well tube to which a pump of any ordinary construction may be applied and 2 is a strainer tube which constitutes a part of the well tube and is adapted to extend downwardly into the earth in which water is supplied to the well tube. The strainer tube 2 is a form of device commonly utilized in deep well pumps and no invention *per se* is herein claimed therefor.

It frequently occurs that the water line which should normally be above all of the perforations in the strainer tube becomes lowered to such perforations and as a consequence air is sucked through the perforations in the strainer tube to the interior thereof and drawn therefrom to the pump. To obviate the occurrence just mentioned I provide an inner tube 3 which is positioned within the strainer tube and is concentric therewith, this inner tube being supported from the top of the strainer tube and extended downwardly in the strainer tube from the position above the perforations therein to a position considerably beneath the uppermost perforations of the strainer tube and preferably to a position near the bottom of the strainer tube. The inner tube 3 supports and is open to communication with the well tube 1 at its upper end and is provided with an inlet opening for the water at its lower end. The inlet opening of said tube is controlled by a check valve 4 of any suitable kind.

In the practical use of a pump having my well tube construction the water must necessarily gain the entrance into the well tube by passing to the lower end of the inner tube 3 and at a point very much beneath the upper perforated portion of the strainer tube 2 so that there is no possibility of air being sucked into the well tube and the action of the pump is consequently at all times a normal one.

To provide against the occurrence of a vacuum in the space between the upper unperforated portion of the strainer tube and the upper portion of the inner tube 3, I apply to the upper unperforated portion of the strainer tube an air conducting inlet pipe 5 that leads into the space just mentioned and through which air may be delivered downwardly into said space from the surface of the ground. The air conducting inlet pipe is provided with a cut-off valve 6.

By this invention the pumps will get the full capacity of the strainer tube and well tube. Without this the pumps will suck mostly from the top of the strainer tube which has a tendency to clog the lower part of the strainer tube and thus decrease the capacity of the well.

The strainer tube 2 is provided with a flange 2ᵃ at the top upon which is seated the supporting flange 3ᵃ of the inner tube 3 which in turn receives the flange 1ᵃ of the well tube 1; the three flanges being securely fastened together by bolts 7.

I claim:

The combination of a perforated strainer, formed with an imperforate upper part having a flange, an imperforate inner tube formed with a supporting flange at its upper end seated upon the flange of the strainer tube, and provided with a vertically reciprocating check valve at its lower end, a well tube formed with a flange seated upon the supporting flange of the inner tube, means for securing the flanges together and an air conducting inlet pipe having a controlling valve and connected through the imperforate upper part of the strainer with the space between the strainer tube and the inner tube.

WM. S. DUNSTEDTER.

In presence of:
WM. MEHRUSKER,
BARNEY RINGERING.